US011902136B1

(12) United States Patent
Miriyala et al.

(10) Patent No.: US 11,902,136 B1
(45) Date of Patent: *Feb. 13, 2024

(54) ADAPTIVE FLOW MONITORING (71) Applicant: Juniper Networks, Inc., Sunnyvale, CA (US)

(72) Inventors: Prasad Miriyala, San Jose, CA (US); Suresh Palguna Krishnan, Fremont, CA (US); SelvaKumar Sivaraj, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,174

(22) Filed: May 19, 2022

Related U.S. Application Data (63) Continuation of application No. 17/410,887, filed on Aug. 24, 2021, now Pat. No. 11,405,297.

(51) Int. Cl.
*H04L 43/0888* (2022.01)
*H04L 43/0894* (2022.01)
*H04L 43/16* (2022.01)
*H04L 43/026* (2022.01)

(52) U.S. Cl.
CPC ........ *H04L 43/0888* (2013.01); *H04L 43/026* (2013.01); *H04L 43/0894* (2013.01); *H04L 43/16* (2013.01)

(58) Field of Classification Search
CPC .............. H04L 43/0888; H04L 43/026; H04L 43/0894; H04L 43/16
See application file for complete search history.

(56) References Cited

U.S. PATENT DOCUMENTS

| 9,246,828 B1* | 1/2016 | Tagore .................... H04L 47/11 |
| 9,282,048 B1 | 3/2016 | Fichter et al. |
| 9,294,113 B2 | 3/2016 | Feizi-Khandkandi et al. |

(Continued)

OTHER PUBLICATIONS

Chowdhury et al., "PayLess: A Low Cost Network Monitoring Framework for Software Defined Networks," 2014 IEEE Network Operations and Management Symposium (NOMS), May 5-9, 2014, 9 pp.

(Continued)

*Primary Examiner* — Jerry B Dennison
(74) *Attorney, Agent, or Firm* — Shumaker & Sieffert, P.A.

(57) ABSTRACT

An example network device includes memory, a communication unit, and processing circuitry coupled to the memory and the communication unit. The processing circuitry is configured to receive first samples of flows from an interface of another network device sampled at a first sampling rate and determine a first parameter based on the first samples. The processing circuitry is configured to receive second samples of flows from the interface sampled at a second sampling rate, wherein the second sampling rate is different than the first sampling rate and determine a second parameter based on the second samples. The processing circuitry is configured to determine a third sampling rate based on the first parameter and the second parameter, control the communication unit to transmit a signal indicative of the third sampling rate to the another network device; and receive third samples of flows from the interface sampled at the third sampling rate.

14 Claims, 5 Drawing Sheets

(56) References Cited

U.S. PATENT DOCUMENTS

| | | | |
|---|---|---|---|
| 9,577,906 | B2 | 2/2017 | Ferreira et al. |
| 9,621,472 | B1 | 4/2017 | Fichter et al. |
| 9,929,965 | B1 | 3/2018 | Ravindranath Tagore |
| 10,097,464 | B1 | 10/2018 | Conlon et al. |
| 10,187,274 | B1 | 1/2019 | R. et al. |
| 10,924,418 | B1* | 2/2021 | Gudibanda ............ H04L 43/024 |
| 11,405,297 | B1* | 8/2022 | Miriyala ............. H04L 43/0894 |
| 2006/0159028 | A1 | 7/2006 | Curran-Gray et al. |
| 2009/0089558 | A1* | 4/2009 | Bradford ................ G05B 21/02 712/225 |
| 2014/0198669 | A1 | 7/2014 | Brown et al. |
| 2015/0074258 | A1 | 3/2015 | Ferreira et al. |
| 2017/0126550 | A1 | 5/2017 | Taylor et al. |
| 2019/0058641 | A1* | 2/2019 | Mirzazad Barijough .................... H04L 43/026 |
| 2020/0358674 | A1* | 11/2020 | Harikrishnan ........ H04L 43/026 |
| 2021/0149394 | A1* | 5/2021 | Li ........................ G07C 5/0808 |
| 2022/0036302 | A1 | 2/2022 | Cella et al. |
| 2023/0018908 | A1* | 1/2023 | Yue ..................... H04L 63/1425 |

OTHER PUBLICATIONS

Notice of Allowance from U.S. Appl. No. 17/410,887, dated Apr. 12, 2022, 20 pp.

Extended Search Report from counterpart European Application No. 22185904.4 dated Dec. 22, 2022, 14 pp.

Kim et al., "Deep Reinforcement Learning-Based Traffic Sampling for Multiple Traffic Analyzers on Software-Defined Networks", IEEE Access, vol. 9, Mar. 2021, pp. 47815-47827.

Response to Extended Search Report dated Dec. 22, 2022, from counterpart European Application No. 22185904.4 filed Sep. 1, 2023, 17 pp.

* cited by examiner

ADAPTIVE FLOW MONITORING

This application is a continuation of U.S. patent application Ser. No. 17/410,887, filed 24 Aug. 2021, the entire contents of which is incorporated herein by reference.

TECHNICAL FIELD

This disclosure relates to analysis of computer networks.

BACKGROUND

Virtualized data centers are becoming a core foundation of the modern information technology (IT) infrastructure. Modern data centers have extensively utilized virtualized environments in which virtual hosts, such virtual machines or containers, are deployed and executed on an underlying compute platform of physical computing devices.

Virtualization within a large-scale data center can provide several advantages, including efficient use of computing resources and simplification of network configuration. Thus, enterprise IT staff often prefer virtualized compute clusters in data centers for their management advantages in addition to the efficiency and increased return on investment (ROI) that virtualization provides. However, virtualization can cause some challenges when analyzing, evaluating, and/or troubleshooting the operation of the network.

SUMMARY

This disclosure describes techniques for adaptive flow monitoring. Flow monitoring includes a process of monitoring traffic flows within a network. Flow monitoring may enable network administrators to attain better understandings of networks they are administering, enable automation of specific network administration tasks, and/or perform other activities.

Ideally one would sample every packet, but sampling every packet may be expensive to implement, may be taxing on processing resources, and may additionally add to network equipment footprints. As such, sampled flow techniques, such as sFlow, have been developed to sample flows at a given sampling rate. Currently, a network administrator may provision such a sampling rate in a flow collector for a given interface of another network device, such as a Top of the Rack (ToR) switch, or other network device. However, flows change over time and a manually provisioned sampling rate may become ineffective or may be too taxing on processing resources. For example, the manually provisioned sampling rate may not be fast enough to sample all flows of the interface or may be too fast for processing circuitry to handle. Therefore, it may be desirable to adaptively sample flows.

According to the techniques of this disclosure, a network device may change a sampling rate of the flows from an interface based on the existence of a change in a parameter of the sampled of flows or the lack of a change (or lack of a significant change) in the parameter sampled of flows. For example, if changing to a lower sampling rate results in substantially the same number of flows being monitored as a higher sampling rate, the lower sampling rate may be better than the higher sampling rate because the higher sampling rate may be viewed as wasteful of processing resources. On the other hand, if changing to a lower sampling rate results in a substantially lower number of flows being monitored than the higher sampling rate, the higher sampling rate may be better than the lower sampling rate because the lower sampling rate does not permit the monitoring of all the flows.

In one example, this disclosure describes a method including receiving first samples of flows from an interface of a network device sampled at a first sampling rate; determining a first parameter based on the first samples; receiving second samples of flows from the interface sampled at a second sampling rate, wherein the second sampling rate is different than the first sampling rate; determining a second parameter based on the second samples; determining a third sampling rate based on the first parameter and the second parameter; transmitting a signal indicative of the third sampling rate to the network device; and receiving third samples of flows from the interface sampled at the third sampling rate.

In another example, this disclosure describes a network device memory configured to store a plurality of sampling rates; a communication unit configured to transmit signals and receive samples of data flows; and processing circuitry communicatively coupled to the memory and the communication unit, the processing circuitry being configured to: receive first samples of flows from an interface of another network device sampled at a first sampling rate; determine a first parameter based on the first samples; receive second samples of flows from the interface sampled at a second sampling rate, wherein the second sampling rate is different than the first sampling rate; determine a second parameter based on the second samples; determine a third sampling rate based on the first parameter and the second parameter; control the communication unit to transmit a signal indicative of the third sampling rate to the another network device; and receive third samples of flows from the interface sampled at the third sampling rate.

In another example, this disclosure describes a computer-readable medium comprising instructions for causing a programmable processor to: receive first samples of flows from an interface sampled at a first sampling rate; determine a first parameter based on the first samples; receive second samples of flows from the interface at a second sampling rate, wherein the second sampling rate is different than the first sampling rate; determine a second parameter based on the second samples; determine a third sampling rate based on the first parameter and the second parameter; control a communication unit to transmit a signal indicative of the third sampling rate to the network device; and receive third samples of flows from the interface sampled at the third sampling rate.

The details of one or more examples are set forth in the accompanying drawings and the description below. Other features, objects, and advantages will be apparent from the description and drawings, and from the claims.

DETAILED DESCRIPTION

Data centers that use virtualized environments in which virtual hosts, such virtual machines or containers, are deployed and executed on an underlying compute platform of physical computing devices provide efficiency, cost, and organizational advantages. Yet obtaining meaningful insights into application workloads is nevertheless essential in managing any data center fabric. Collecting flow datagrams, which may include traffic samples) from networking devices may help provide such insights.

Sampling every packet may be overly expensive and may prevent a network device from performing the primary function of the network device, such as routing, switching, or processing packets. Sampling packets of an interface may be performed at a sampling rate that may provide a trade-off between the expense of sampling every packet and permitting network devices to focus their processing power on their primary purpose. However, a statically provisioned sampling rate may become outdated as flows change. Therefore, it may be desirable to provide for adaptive flow monitoring.

In accordance with one or more aspects of this disclosure, a network device may adapt the sampling rate on an interface based on changes in flow parameters, such as changes in determined numbers of flows at different sampling rates. In various examples described herein, the network device may recursively receive samples of flows from an interface of another network device that are sampled at different sampling rates and determine parameters of such flows until a last determined parameter is different, or substantially different, than an immediately prior determined parameter. In some examples, the determined parameters are numbers of flows. In some examples, the different sampling rates are progressively lower, each sampling rate being lower than the previous sampling rate. In some examples, once the network device determines the last determined parameter to be different, or substantially different, than the immediately prior determined parameter, the network device may instruct the another network device to sample at a higher sampling rate than the last sampling rate. The samples of flows may provide insights into the network, and provide users, administrators, and/or other personnel with tools for network discovery, investigation, and troubleshooting.

Figure 1A:
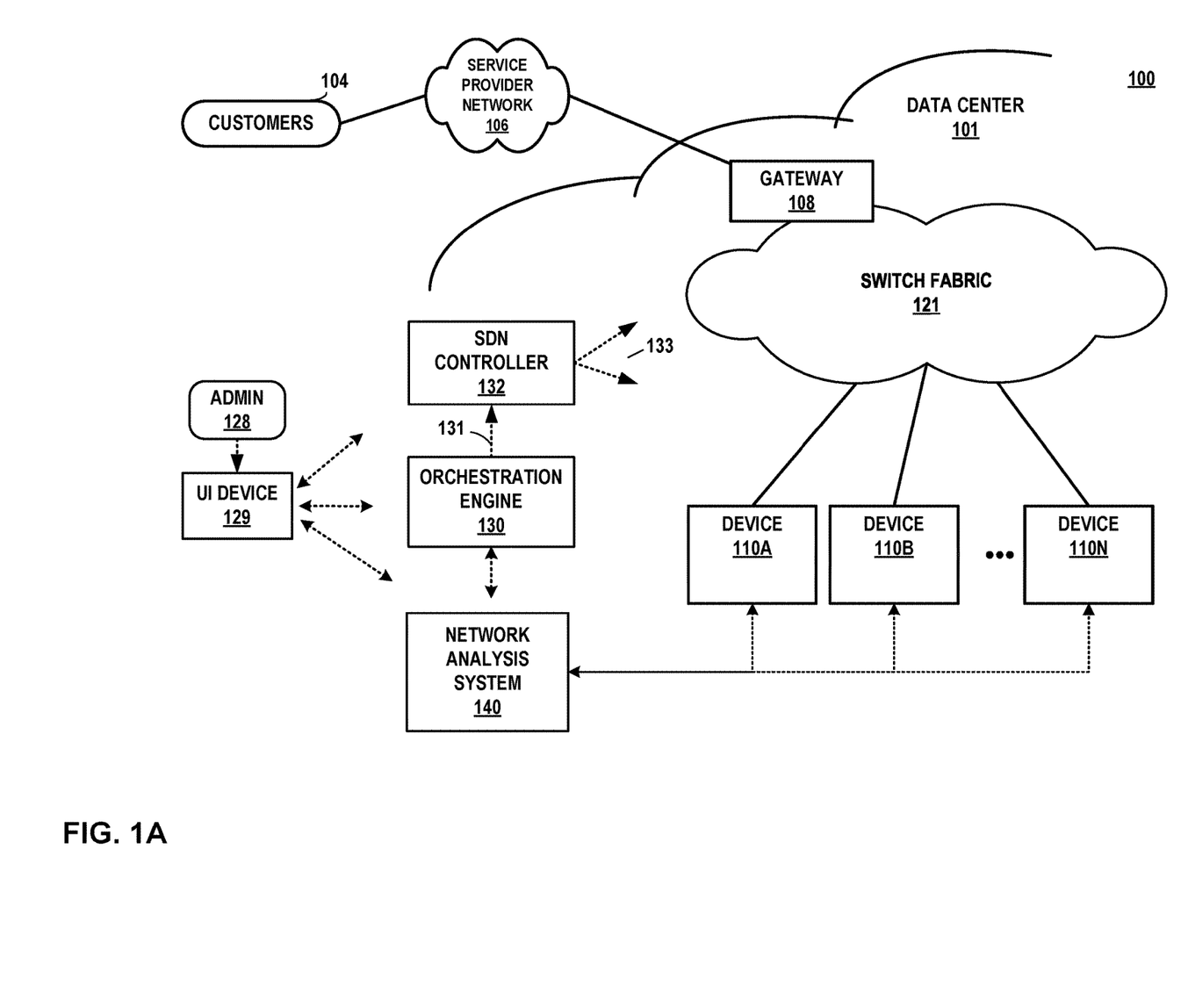
FIG. 1A is a conceptual diagram illustrating an example network that includes a system for analyzing traffic flows across a network and/or within a data center, in accordance with one or more aspects of the present disclosure.

FIG. 1A is a conceptual diagram illustrating an example network that includes a system for analyzing traffic flows across a network and/or within a data center, in accordance with one or more aspects of the present disclosure. FIG. 1A illustrates one example implementation of a network system 100 and a data center 101 that hosts one or more computing networks, computing domains or projects, and/or cloud-based computing networks generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network system 100 and data center 101 may be appropriate in other instances. Such implementations may include a subset of the components included in the example of FIG. 1A and/or may include additional components not shown in FIG. 1A.

In the example of FIG. 1A, data center 101 provides an operating environment for applications and services for customers 104 coupled to data center 101 by service provider network 106. Although functions and operations described in connection with network system 100 of FIG. 1A may be illustrated as being distributed across multiple devices in FIG. 1A, in other examples, the features and techniques attributed to one or more devices in FIG. 1A may be performed internally by local components of one or more of such devices. Similarly, one or more of such devices may include certain components and may perform various techniques that may otherwise be attributed in this disclosure to one or more other devices. Further, this disclosure may describe certain operations, techniques, features, and/or functions in connection with FIG. 1A or otherwise as performed by specific components, devices, and/or modules. In other examples, other components, devices, or modules may perform such operations, techniques, features, and/or functions. Accordingly, some operations, techniques, features, and/or functions attributed to one or more components, devices, or modules may be attributed to other components, devices, and/or modules, even if not specifically described herein in such a manner.

Data center 101 hosts infrastructure equipment, such as networking and storage systems, redundant power supplies, and environmental controls. Service provider network 106 may be coupled to one or more networks administered by other providers and may thus form part of a large-scale public network infrastructure, e.g., the Internet.

In some examples, data center 101 may represent one of many geographically distributed network data centers. As illustrated in the example of FIG. 1A, data center 101 is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 101 is an individual network server, a network peer, or otherwise.

In the example of FIG. 1A, data center 101 includes a set of storage systems, application servers, compute nodes, or other devices, including network device 110A through network device 110N (collectively "network devices 110," representing any number of network devices). Devices 110 may be interconnected via high-speed switch fabric 121 provided by one or more tiers of physical network switches and routers. In some examples, devices 110 may be included within fabric 121, but are shown separately for ease of illustration. Network devices 110 may be any of a number of different types of network devices (core switches, top-of-rack (TOR) switches, spine network devices, leaf network devices, edge network devices, or other network devices), but in some examples, one or more devices 110 may serve as physical compute nodes of the data center. For example, one or more of devices 110 may provide an operating environment for execution of one or more customer-specific virtual machines or other virtualized instances, such as containers. In such an example, one or more of devices 110 may be alternatively referred to as a host computing device or, more simply, as a host. A network device 110 may thereby execute one or more virtualized instances, such as virtual machines, containers, or other virtual execution environment for running one or more services, such as virtualized network functions (VNFs).

In general, each of network devices 110 may be any type of device that operates on a network and which may generate data (e.g., flow datagrams, sFlow datagrams, NetFlow datagrams, etc.) accessible through telemetry or otherwise, which may include any type of computing device, sensor, camera, node, surveillance device, or other device. Further, some or all of network devices 110 may represent a component of another device, where such a component may generate data collectible through telemetry or otherwise. For example, some or all of network devices 110 may represent physical or virtual network devices, such as switches, routers, hubs, gateways, security devices such as firewalls, intrusion detection, and/or intrusion prevention devices.

Data center 101 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 101 and customers 104 by service provider network 106. Gateway 108 acts to forward and receive packets between switch fabric 121 and service provider network 106.

Software-Defined Networking ("SDN") controller 132 provides a logically and, in some cases, physically centralized controller for facilitating operation of one or more virtual networks within data center 101 in accordance with one or more examples of this disclosure. In some examples, SDN controller 132 operates in response to configuration input received from orchestration engine 130 via northbound API 131, which in turn may operate in response to configuration input received from an administrator 128 interacting with and/or operating user interface device 129.

User interface device 129 may be implemented as any suitable device for presenting output and/or accepting user input. For instance, user interface device 129 may include a display. User interface device 129 may be a computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure. In some examples, user interface device 129 may be physically separate from and/or in a different location than controller 201. In such examples, user interface device 129 may communicate with controller 201 over a network or other means of communication. In other examples, user interface device 129 may be a local peripheral of controller 201 or may be integrated into controller 201.

In some examples, orchestration engine 130 manages functions of data center 101 such as compute, storage, networking, and application resources. For example, orchestration engine 130 may create a virtual network for a tenant within data center 101 or across data centers. Orchestration engine 130 may attach virtual machines (VMs) to a tenant's virtual network. Orchestration engine 130 may connect a tenant's virtual network to an external network, e.g., the Internet or a VPN. Orchestration engine 130 may implement a security policy across a group of VMs or to the boundary of a tenant's network. Orchestration engine 130 may deploy a network service (e.g., a load balancer) in a tenant's virtual network.

In some examples, SDN controller 132 manages the network and networking services such load balancing, security, and may allocate resources from devices 110 that serve as host devices to various applications via southbound API 133. That is, southbound API 133 represents a set of communication protocols utilized by SDN controller 132 to make the actual state of the network equal to the desired state as specified by orchestration engine 130. For example, SDN controller 132 may implement high-level requests from orchestration engine 130 by configuring physical switches, e.g., TOR switches, chassis switches, and switch fabric 121; physical routers; physical service nodes such as firewalls and load balancers; and virtual services such as virtual firewalls in a VM. SDN controller 132 maintains routing, networking, and configuration information within a state database.

Network analysis system 140 interacts with one or more of devices 110 (and/or other devices) to collect flow datagrams from across data center 101 and/or network system 100. Flow datagrams are datagrams that include data representative of flows of network traffic. For instance, agents operating within data center 101 and/or network system 100 may sample flows of packets within data center 101 and/or network system 100 and package sampled packets into flow datagrams. The agents may forward the flow datagrams to network analysis system 140, thereby enabling network analysis system 140 to collect the flow datagrams.

In accordance with one or more aspects of the present disclosure, network analysis system 140 of FIG. 1A may configure each of devices 110 to sample packets at various adaptive sampling rates and to generate flow datagrams. For instance, in an example that can be described with reference to FIG. 1A, network analysis system 140 outputs a signal to each of devices 110. Each of devices 110 receives a signal and interprets the signal as a command to sample at a specified sampling rate and to generate flow datagrams, including sampled packets. Thereafter, each of devices 110 communicates flow datagrams including flow data to network analysis system 140 as data packets are processed by each of devices 110. In the example of FIG. 1A, other network devices, including network devices within switch fabric 121 (and not specifically shown), may also be configured to generate flow datagrams. Network analysis system 140 receives the flow datagrams.

Network analysis system 140 may store rules data for one or more applications. In this disclosure, an "application" is a label for a particular type of traffic data. In some examples, an application may be a generic service, an internal service, or an external application. A generic service may be recognized based on a computing of ports and a protocol. Examples of generic services may include, in Transmission Control Protocol (TCP), port 80 and Hypertext Transfer Protocol (HTTP), port 443 and Hypertext Transfer Protocol Secure (HTTPS), port 22 and Secure Shell (SSH), and so on. An internal service may be a custom service deployed on a virtual machine (VM) or set of VMs. An internal service may be recognized by a combination of Internet Protocol (IP) addresses, ports, protocols, and virtual networks (VNs). An external application may be a global service name which traffic is related to. An external application may be recognized by a combination of ports, IP addresses, Domain Name Service (DNS) domains, etc.

As noted above, network analysis system 140 may receive a stream of flow datagrams. Network analysis system 140 may use the rule data for an application to identify, within the stream of flow datagrams, flow datagrams that are associated with the application.

When sampling flows, processing resources of a network device, such as network device 110A are needed to add flow headers (such as sFlow headers) and send the samples to network analysis system (e.g., a flow collector of network analysis system 140) after receiving the sample from, for example, a packet forwarding engine (PFE). It may be desirable to ensure that the processing resource usage by the flow daemon does not affect other functions of network device 110A. A relatively low sampling rate may be used to avoid over taxing the processing resources of the network device. However, with a relatively low sampling rate, some flows might not be captured by network analysis system 140.

Therefore, it may be desirable to find a sampling rate for an interface of a network device, such as network device 110A, that does not overly tax the processing power of network device 110A, but that still permits network analysis system 140 to receive samples from each flow being handled by the interface so as to acquire accurate statistics. For example, network analysis system 140 may transmit a command to network device 110A to sample flows at a first, initial sampling rate. In some examples, this first, initial sampling rate may be relatively high so as to capture samples of each flow being handled by interfaces of network device 110A. Network device 110A may transmit flow datagrams to network analysis system 140 including samples of flows sampled at the initial sampling rate. Network analysis system 140 may determine a first parameter associated with the flow datagrams. Network analysis system 140 may transmit a command to network device 110A to sample flows at a second, lower sampling rate. Network device 110A may transmit flow datagrams to network analysis system 140 including samples of flows sampled at the second sampling rate. Network analysis system 140 may determine a second parameter associated with the flow datagrams based on the samples of flows sampled at the second sampling rate. Network analysis system 140 may compare the first parameter to the second parameter and determine whether the first parameter is substantially the same as the second parameter. If the first parameter and the second parameter are the same or substantially the same (e.g., within a predetermined threshold of each other), network analysis system 140 may transmit a command to network device 110A to sample flows of the interface at a third, still lower sampling rate. Network analysis system 140 and network device 110A may continue this process recursively until the parameter is different or substantially different (e.g., outside the predetermined threshold of each other) at which time, network analysis system 140 may transmit a command to network device 110A to sample at a higher sampling rate.

For example, network analysis system 140 may transmit a command to network device 110A to sample flows at a first, initial sampling rate. Network device 110A may transmit flow datagrams to network analysis system 140 including samples of flows sampled at the initial sampling rate. Network analysis system 140 may determine a first number of flows based on the samples sampled at the first sampling rate. Network analysis system 140 may transmit a command to network device 110A to sample flows at a second, lower sampling rate. Network device 110A may transmit flow datagrams to network analysis system 140 including samples of flows sampled at the second sampling rate. Network analysis system 140 may determine a second number of flows based on the samples sampled at the second sampling rate. Network analysis system 140 may compare the first number of flows to the second number of flows. If the first number of flows and the second number of flows are equal or relatively equal (e.g., within a predetermined threshold of each other), network analysis system 140 may transmit a command to network device 110A to sample flows of the interface at a third, still lower sampling rate. Network analysis system 140 and network device 110A may continue this process recursively until the determined number of flows is fewer or substantially fewer (e.g., outside the predetermined threshold of each other) at which time, network analysis system 140 may transmit a command to network device 110A to sample at a higher sampling rate. In some examples, network analysis system 140 may repeat this process with network devices 110 periodically. In this manner, network analysis system 140 may determine a suitable sampling rate for any given interface of network devices 110 that may avoid overloading of the processing resources of the network device and keep the device operating at a relatively optimum level even when there is a change in traffic patterns on an interface.

In some examples, network analysis system 140 may determine a maximum number of flows that network analysis system 140 can handle and the sampling rates may be further based on the maximum number of flows in order to avoid overloading network analysis system 140.

In some examples, certain interfaces of network devices 110 may handle a relatively large number of flows which may require a higher sampling rate than other interfaces in order to sample each of the flows handled by the certain interfaces. In such cases, a less aggressive approach may be used to lowering the sampling rate for these interfaces. For example, network analysis system 140 may receive samples of flows from a second interface of network device 110A sampled at the first, initial sampling rate. Network analysis system 140 may determine a number of flows based on the samples. Network analysis system 140 may determine that the number of flows is greater than or equal to a predetermined threshold. Network analysis system 140 may determine a new, fourth sampling rate based on the number of flows being greater than or equal to the predetermined threshold, and transmit a signal indicative of the new, fourth sampling rate to network device 110A. This new, fourth sampling rate may be higher than the second sampling rate mentioned above. In this manner, network analysis system may less aggressively lower the sampling rate for the second interface which is handling a relatively large number of flows.

In some examples, certain interfaces may be deemed to be more important as they may handle traffic that is, for example, more meaningful flows for a Quality of Experience (QoE) of an application. In such cases, a less aggressive approach may be used to lowering the sampling rate for those certain interfaces. For example, network analysis system 140 may receive samples of flows from a second interface of network device 110A sampled at the first, initial sampling rate. Network analysis system 140 may determine that the second interface is handing more meaningful flows for a QoS than the first interface. For example, network analysis system 140 may perform a deep packet inspection to determine that the second interface is handling more meaningful flows for a QoS than the first interface. Network analysis system 140 may determine a new, fourth sampling rate based on the second interface handling more meaningful flows for a quality of experience than the first interface, and transmit a signal indicative of the new, fourth sampling rate to network device 110A. This new, fourth sampling rate may be higher than the second sampling rate mentioned above. In this manner, network analysis system may less aggressively lower the sampling rate for the second interface which is handling more meaningful flows for a QoS than the first interface.

For example, network analysis system 140 may dynamically adjust the sampling rate for each interface of network devices 110 independently to identify a suitable sampling rate for each interface. In some examples, network analysis system 140 may transmit a command to a network device, e.g., network device 110A, to maintain the sampling rate at the suitable sampling rate for a given interface.

For example, the first, initial sampling rate may be 1 packet out of every 100 packets. Network analysis system 140 may transmit a command to network device 110A to sample flows at the rate of 1 packet out of every 100 packets. Network analysis system 140 may receive flow datagrams from network device 110 including samples of flows that were sampled at the rate of 1 packet out of every 100 packets. Network analysis system 140 may determine the number of flows based on those samples. Network analysis system 140 may then transmit a command to sample the flows at a lower sampling rate, such as 1 packet out of every 200 packets. Network analysis system 140 may receive flow datagrams from network device 110 including samples of flows that were sampled at the rate of 1 packet out of every 200 packets. Network analysis system 140 may determine the number of flows based on those samples. Network analysis system 140 may compare the numbers of determined flows. If the determined numbers of flows are equal or relatively equal, network analysis system 140 may continue to reduce the sampling rate, such as to 1 packet out of every 400 packets. This process may be repeated until the determined number of flows are not equal or are substantially different, then network analysis system 140 may transmit a command to increase the sampling rate. In some examples, when a suitable sampling rate is determined for a given interface, network analysis system may cease to apply the adaptive sampling for that interface or less frequently apply the adaptive sampling for that interface. While the sampling rates discussed herein are based on numbers of packets, in some examples, the sampling rates may be based on time, for example, 1 sample per tenth of a second.

Figure 1B:
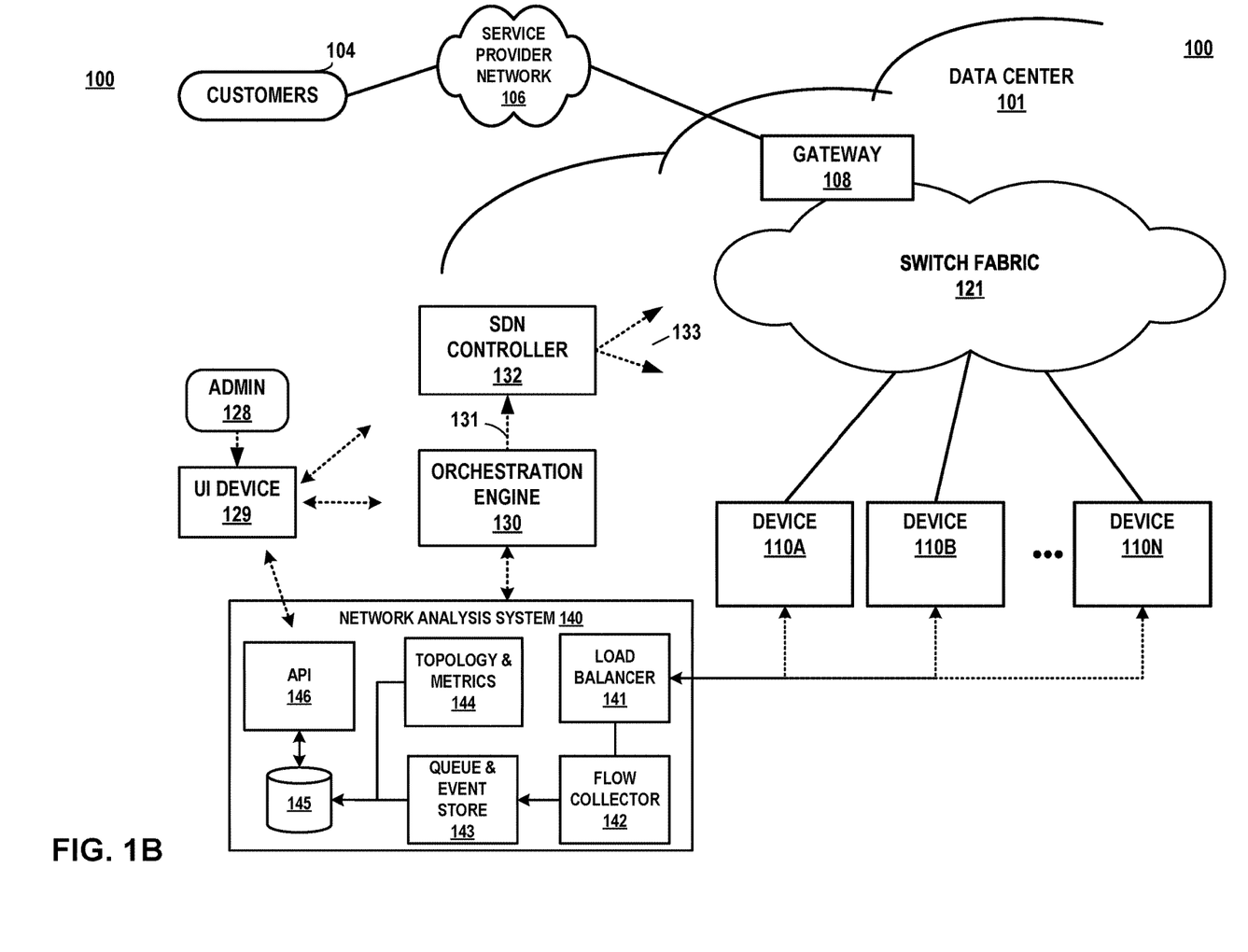
FIG. 1B a conceptual diagram illustrating example components of a system for analyzing traffic flows across a network and/or within a data center, in accordance with one or more aspects of the present disclosure.

FIG. 1B a conceptual diagram illustrating example components of a system for analyzing traffic flows across a network and/or within data center, in accordance with one or more aspects of the present disclosure. FIG. 1B includes many of the same elements described in connection with FIG. 1A. Elements illustrated in FIG. 1B may correspond to elements illustrated in FIG. 1A that are identified by like-numbered reference numerals in FIG. 1A. In general, such like-numbered elements may be implemented in a manner consistent with the description of the corresponding element provided in connection with FIG. 1A, although in some examples, such elements may involve alternative implementations with more, fewer, and/or different capabilities and attributes.

Unlike FIG. 1A, however, FIG. 1B illustrates components of network analysis system 140. Network analysis system 140 is shown as including load balancer 141, flow collector 142, queue & event store 143, topology & metrics source 144, data store 145 and flow API 146. In general, network analysis system 140 and components of network analysis system 140 are designed and/or configured to ensure high availability and an ability to process a high volume of flow data. In some examples, multiple instances of components of network analysis system 140 may be orchestrated (e.g., by orchestration engine 130) to execute on different physical servers to ensure that there is no single point of failure for any component of network analysis system 140. In some examples, network analysis system 140 or components thereof may be scaled independently and horizontally to enable efficient and/or effective processing of a desired volume of traffic (e.g., flow data).

Network analysis system 140 of FIG. 1B may, as in FIG. 1A, configure each of devices 110 to generate flow datagrams at particular sampling rates. For instance, network analysis system 140 may output a signal to each of devices 110 to configure each of devices 110 to generate flow datagrams, including flow datagrams indicating underlay flow data and overlay flow data. One or more of devices 110 may thereafter generate flow datagrams and report such flow datagrams to network analysis system 140.

In FIG. 1B, load balancer 141 of network analysis system 140 receives flow datagrams from devices 110. Load balancer 141 may distribute the flow datagrams across multiple flow collectors to ensure an active/active failover strategy for the flow collectors. In some examples, multiple load balancers 141 may be required to ensure high availability and scalability.

Flow collector 142 collects flow datagrams from load balancer 141. For example, flow collector 142 of network analysis system 140 receives and processes flow datagrams from devices 110 (after processing by load balancer 141). Flow collector 142 sends the flow datagrams upstream to queue & event store 143. In some examples, flow collector 142 may address, process, and/or accommodate unified datagrams in sFlow, NetFlow v9, IPFIX, jFlow, Contrail Flow, and other formats. Flow collector 142 may be capable of parsing inner headers (i.e., headers of packets that are at least partially encapsulated) in sFlow datagrams and other flow datagrams. Flow collector 142 may be able to handle message overflows, enriched flow records with topology information (e.g., AppFormix topology information), and other types of messages and datagrams. Flow collector 142 may also be able to convert data to a binary format before writing or sending data to queue & event store 143. Underlay flow data of the "sFlow" type, which refers to a "sampled flow," is a standard for packet export at Layer 2 of the OSI model. It provides a means for exporting truncated packets, together with interface counters for the purpose of network monitoring.

According to the techniques of this disclosure, flow collector 142 may receive first samples of flows from an interface of network device 110A sampled at a first sampling rate. Flow collector 142 may determine a first parameter based on the first samples. Flow collector 142 may receive second samples of flows from the interface sampled at a second sampling rate, wherein the second sampling rate is different than the first sampling rate. Flow collector 142 may determine a second parameter based on the second samples. Flow collector 142 may determine a third sampling rate based on the first parameter and the second parameter. Flow collector 142 may transmit a signal indicative of the third sampling rate to the network device. Flow collector 142 may receive third samples of flows from the interface sampled at the third sampling rate.

Queue & event store 143 may receive data from one or more flow collectors 142, store the data, and make the data available for ingestion in data store 145. In some examples, this enables separation of the task of receiving and storing large volumes of data from the task of indexing the data and preparing the data for analytical queries. In some examples, queue & event store 143 may also enable independent users to directly consume the stream of flow records. In some examples, queue & event store 143 may be used to discover anomalies and produce alerts in real time. In some examples, flow data may be parsed by reading encapsulated packets, including VXLAN, MPLS over UDP, and MPLS over GRE.

Topology & metrics source 144 may enrich or augment the datagrams with topology information and/or metrics information. For example, topology & metrics source 144 may provide network topology metadata, which may include identified nodes or network devices, configuration information, configuration, established links, and other information about such nodes and/or network devices. In some examples, topology & metrics source 144 may use AppFormix topology data or may be an executing AppFormix module. The information received from topology & metrics source 144 may be used to enrich flow datagrams collected by flow collector 142 and support flow API 146 in processing queries of data store 145.

Data store 145 may be configured to store data, such as datagrams, received from queue & event store 143 and topology & metrics source 144 in an indexed format, enabling fast aggregation queries and fast random-access data retrieval. In some examples, data store 145 may achieve fault tolerance and high availability by sharing and replicating the data.

Flow API 146 may process query requests sent by one or more user interface devices 129. For instance, in some examples, flow API 146 may receive a query request from user interface device 129 through an HTTP POST request. In such an example, flow API 146 converts information included within the request to a query for f 145. To create the query, flow API 146 may use topology information from topology & metrics source 144. Flow API 146 may use one or more of such queries to perform analytics on behalf of user interface device 129. Such analytics may include traffic deduplication, overlay-underlay correlation, traffic path identification, and/or heatmap traffic calculation. In particular, such analytics may involve correlating the underlay flow data with the overlay flow data, thereby enabling identification of which underlay network devices are relevant to traffic flowing over a virtual network and/or between two virtual machines. Through techniques in accordance with one or more aspects of the present disclosure, network analysis system 140 may be able to associate data flows with applications in a data center, such as a multitenant data center.

Figure 2:
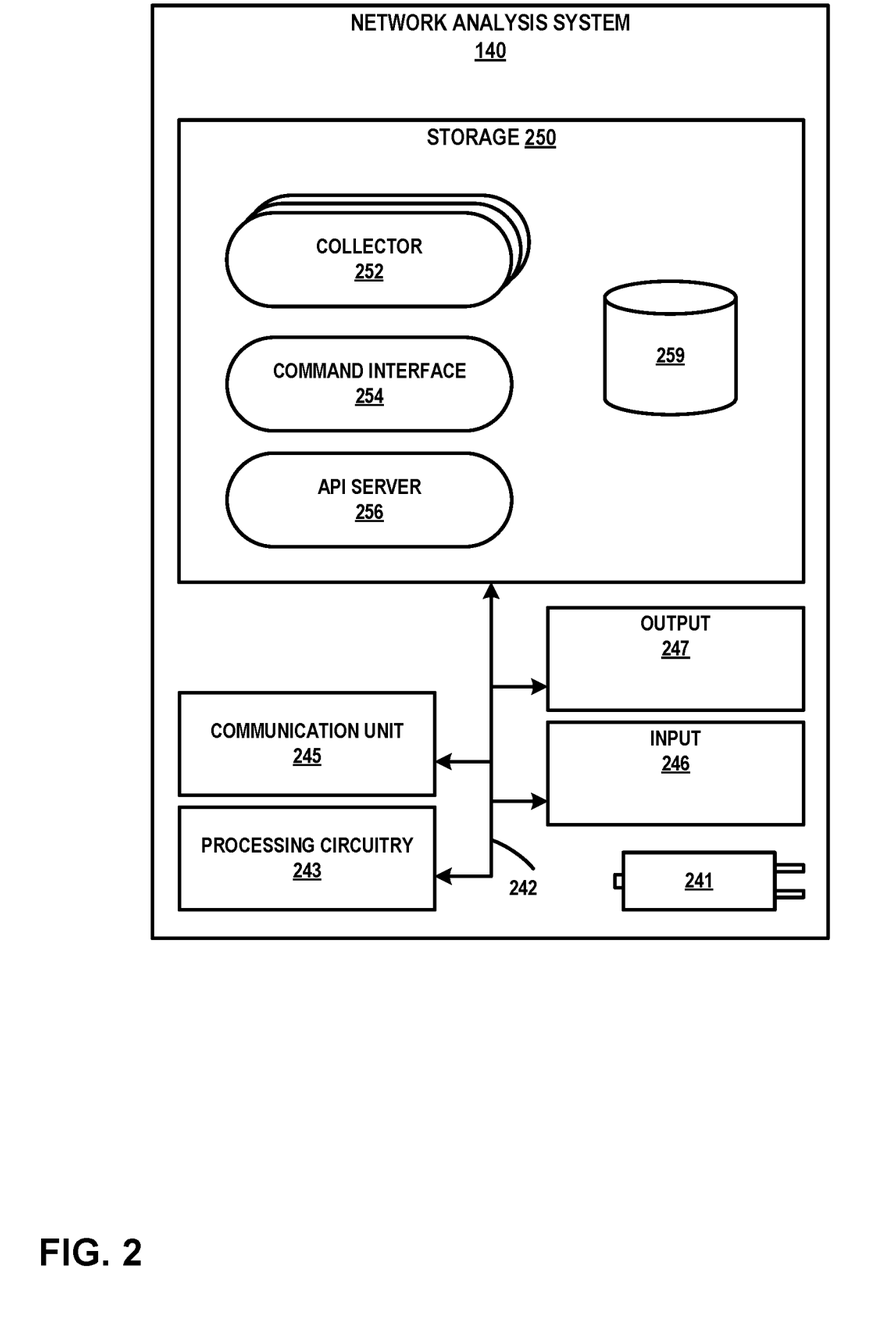
FIG. 2 is a block diagram illustrating an example network analysis system in accordance with one or more aspects of the present disclosure.

FIG. 2 is a block diagram illustrating an example network analysis system in accordance with one or more aspects of the present disclosure.

Network analysis system 140 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, network analysis system 140 represents a cloud computing system, server farm, and/or server cluster (or portion thereof) that provides services to client devices and other devices or systems. In other examples, network analysis system 140 may represent or be implemented through one or more virtualized compute instances (e.g., virtual machines, containers) of a data center, cloud computing system, server farm, and/or server cluster.

In the example of FIG. 2, network analysis system 140 may include power source 241, processing circuitry 243, one or more communication units 245, one or more input devices 246, one or more output devices 247, and one or more storage devices 250. One or more storage devices 250 may include one or more collector modules 252, a command interface module 254, an API server 256, and a flow database 259. In some examples, network analysis system 140 includes additional components, fewer components, or different components.

One or more of the devices, modules, storage areas, or other components of network analysis system 140 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

Power source 241 may provide power to one or more components of network analysis system 140. Power source 241 may receive power from the primary alternating current (AC) power supply in a data center, building, home, or other location. In other examples, power source 241 may be a battery or a device that supplies direct current (DC). In still further examples, network analysis system 140 and/or power source 241 may receive power from another source. One or more of the devices or components illustrated within network analysis system 140 may be connected to power source 241, and/or may receive power from power source 241. Power source 241 may have intelligent power management or consumption capabilities, and such features may be controlled, accessed, or adjusted by one or more modules of network analysis system 140 and/or by processing circuitry 243 to intelligently consume, allocate, supply, or otherwise manage power.

Processing circuitry 243 of network analysis system 140 may implement functionality and/or execute instructions associated with network analysis system 140 or associated with one or more modules illustrated herein and/or described herein. Processing circuitry 243 may be, may be part of, and/or may include processing circuitry that performs operations in accordance with one or more aspects of the present disclosure. Examples of processing circuitry 243 include microprocessors, application processors, display controllers, auxiliary processors, one or more sensor hubs, and any other hardware configured to function as a processor, a processing unit, or a processing device. Network analysis system 140 may use processing circuitry 243 to perform operations in accordance with one or more aspects of the present disclosure using software, hardware, firmware, or a mixture of hardware, software, and firmware residing in and/or executing at network analysis system 140.

For example, processing circuitry 243 may receive first samples of flows from an interface of another network device (e.g., network device 110A) sampled at a first sampling rate. Processing circuitry 243 may determine a first parameter based on the first samples. For example, processing circuitry 243 may count a first number of flows based on the first samples. In some examples, processing circuitry 243 may control one or more communication units 245 to transmit a signal indicative of a second sampling rate to network device 110A. Processing circuitry 243 may receive second samples of flows from the interface sampled at a second sampling rate, wherein the second sampling rate is different than the first sampling rate. Processing circuitry 243 may determine a second parameter based on the second samples. For example, processing circuitry 243 may count a second number of flows based on the second samples. Processing circuitry 243 may determine a third sampling rate based on the first parameter and the second parameter.

For example, if the first parameter and the second parameter are substantially the same, processing circuitry may determine a third sampling rate which is lower than the first and second sampling rates. If the first parameter and the second parameter are substantially different, processing circuitry 243 may determine a third sampling rate that is higher than the second sampling rate. Processing circuity 243 may control one or more communication units 245 to transmit a signal indicative of the third sampling rate to network device 110A. Processing circuitry 243 may receive third samples of flows from the interface sampled at the third sampling rate.

One or more communication units 245 of network analysis system 140 may communicate with devices external to network analysis system 140 by transmitting and/or receiving data, and may operate, in some respects, as both an input device and an output device. For example, one or more communication units 245 may transmit signals indicative of various sampling rates to network devices, such as network devices 210. One or more communication units 245 may also receive datagrams including samples of packets sampled at various sampling rates.

In some examples, one or more communication units 245 may communicate with other devices over a network. In other examples, one or more communication units 245 may send and/or receive radio signals on a radio network such as a cellular radio network. Examples of one or more communication units 245 include a network interface card (e.g., such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of network analysis system 140 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of network analysis system 140 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator).

One or more storage devices 250 within network analysis system 140 may store information for processing during operation of network analysis system 140. One or more storage devices 250 may store program instructions and/or data associated with one or more of the modules described in accordance with one or more aspects of this disclosure. Processing circuitry 243 and one or more storage devices 250 may provide an operating environment or platform for such modules, which may be implemented as software, but may in some examples include any combination of hardware, firmware, and software. Processing circuitry 243 may execute instructions and one or more storage devices 250 may store instructions and/or data of one or more modules. The combination of processing circuitry 243 and one or more storage devices 250 may retrieve, store, and/or execute the instructions and/or data of one or more applications, modules, or software. Processing circuitry 243 and/or one or more storage devices 250 may also be operably coupled to one or more other software and/or hardware components, including, but not limited to, one or more of the components of network analysis system 140 and/or one or more devices or systems illustrated as being connected to network analysis system 140.

In some examples, one or more storage devices 250 are implemented through temporary memory, which may mean that a primary purpose of the one or more storage devices is not long-term storage. One or more storage devices 250 of network analysis system 140 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. One or more storage devices 250, in some examples, also include one or more computer-readable storage media. One or more storage devices 250 may be configured to store larger amounts of information than volatile memory. One or more storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Collector modules 252 may perform functions relating to receiving flow datagrams, determining parameters associated with sampled flows, such as a number of flows sampled at a given sampling rate, and performing load balancing as necessary to ensure high availability, throughput, and scalability for collecting such flow data when executed by processing circuitry 243. Collector modules 252 may process the data and prepare the data for storage within flow database 259. In some examples, collector modules 252 may store the flow data within flow database 259.

Command interface module 254 may perform functions relating to generating user interfaces for presenting the results of analytical queries performed by API server 256 when executed by processing circuitry 243. In some examples, command interface module 254 may generate information sufficient to generate a set of user interfaces.

API server 256 may perform analytical queries involving data stored in flow database 259 that is derived from collection of flow datagrams. In some examples, API server 256 may receive a request in the form of information derived from an HTTP POST request, and in response, may convert the request into a query to be executed on flow database 259. Further, in some examples, API server 256 may fetch topology information pertaining to network device 110A, and perform analytics that include data deduplication, overlay-underlay correlation, traffic path identification, and heat-map traffic calculation.

Flow database 259 may represent any suitable data structure or storage medium for storing information related to data flow information, including storage of flow datagrams. Flow database 259 may store data in an indexed format, which may enable fast data retrieval and execution of queries. The information stored in flow database 259 may be searchable and/or categorized such that one or more modules within network analysis system 140 may provide an input requesting information from flow database 259, and in response to the input, receive information stored within flow database 259. Flow database 259 may be primarily maintained by collector modules 252. Flow database 259 may be implemented through multiple hardware devices and may achieve fault tolerance and high availability by sharing and replicating data. In some examples, flow database 259 may be implemented using the open source ClickHouse column-oriented database management system.

Command interface module 254 of network analysis system 140 may receive a query, for example, from user interface device 129 (FIGS. 1A-1B). Communication unit 215 of network analysis system 140 detects a signal and provides information to command interface module 254, which in turn provide a query based on the provided information to API server 256. The query may be a request for information about network system 100 for a given time window. API server 256 processes the query on data in flow database 259. For example, a user of user interface device 129 (e.g., administrator 128) may want to determine which of network devices 110 are involved in a flow associated with a particular application. API 146 (FIG. 1B) may operate in the same way as API server 256.

Network analysis system 140 may cause a user interface based on results of the query to be presented at user interface device 129. For example, API server 256 may output information about the query results to command interface module 254. In this example, command interface module 254 uses the information from API server 256 to generate data sufficient to create the user interface. Furthermore, in this example, command interface module 254 causes one or more communication units 245 to output a signal. In this example, user interface device 129 detects the signal and generates a user interface based on the signal. User interface device 129 presents the user interface at a display associated with user interface device 129.

Modules illustrated in FIG. 2 (collector modules 252, command interface module 254, API server 256) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
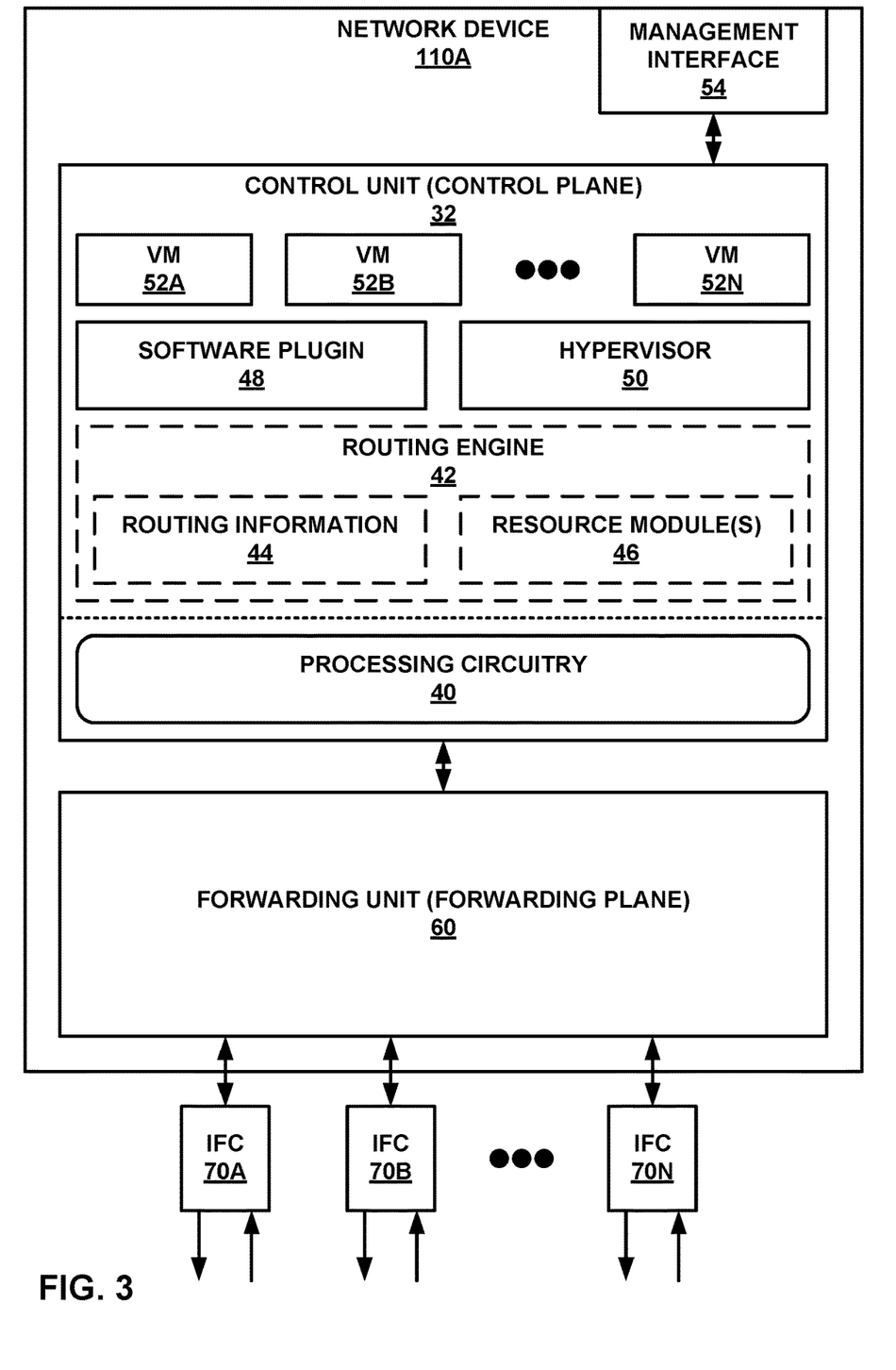
FIG. 3 is a block diagram illustrating an example network device in accordance with one or more aspects of the present disclosure.

FIG. 3 is a block diagram illustrating an example network device in accordance with one or more aspects of the present disclosure. In some examples, network device 110A may be an example of a TOR switch or a chassis switch.

In the illustrated example of FIG. 3, network device 110A includes a control unit 32 that, in some examples, provides control plane functionality for network device 110A. Control unit 32 may include processing circuitry 40, routing engine 42 including routing information 44 and resource module(s) 46, software plugin 48, hypervisor 50, and VMs 52A-52N (collectively, "VMs 52"). Processing circuitry 40, in some examples, may include one or more processors that are configured to implement functionality and/or process instructions for execution within control unit 32. For example, processing circuitry 40 may be capable of processing instructions stored in a storage device. Processing circuitry 40 may include, for example, microprocessors, DSPs, ASICs, FPGAs, or equivalent discrete or integrated logic circuitry, or a combination of any of the foregoing devices or circuitry. Accordingly, processing circuitry 40 may include any suitable structure, whether in hardware, software, firmware, or any combination thereof, to perform the functions ascribed herein to processing circuitry 40.

Processing circuitry 40, in some cases, may include a set of compute nodes. A compute node may be a component of a central processing unit (CPU) that receives information, outputs information, performs calculations, performs actions, manipulates data, or any combination thereof. Additionally, in some examples, compute nodes may include the ephemeral storage, networking, memory, and processing resources for executing one or more VMs, containers, pods, or other types of workloads. In this way, compute nodes may represent computing resources that are used to execute workloads. A compute node that is being used to execute a workload may be referred to herein as an "used compute node." Additionally, a compute node that is not being used to execute a workload may be referred to herein as an "unused compute node." As such, if processing circuitry 40 includes a relatively high number of unused compute nodes, processing circuitry 40 may possess a relatively high amount of computing resources available to execute workloads and if processing circuitry 40 includes a relatively low number of unused compute nodes, processing circuitry 40 may possess a relatively low amount of computing resources available to execute workloads.

Processing circuitry 40 may sample flows being handled by network device 110A and may create flow datagrams including sampled packets of the flows. This sampling and creating flow datagrams uses processing resources of processing circuitry 40. By adaptively changing sampling rates, the techniques of this disclosure may balance the use of processing resources of processing circuitry 40 with the monitoring of flows by flow collector 142.

An amount of available computing resources in control unit 32 may, in some examples, depend on a role of network device 110A within data center 101 of FIG. 1. For example, if network device 110A represents a master switch of a logical switch, a significant amount of computing resources within processing circuitry 40 may be occupied to provide control plane functionality to each switch (e.g., each of network devices 110B-110N) within the logical switch. Whereas, if network device 110A represents a line card, a smaller amount of computing resources within processing circuitry 40 may be occupied than cases in which network device 110A represents a master switch, since line cards may receive control plane functionality from the master switch.

In some examples where control unit 32 provides control plane functionality to network device 110A and/or other network devices, control unit 32 includes a routing engine 42 configured to communicate with a forwarding unit 60 and other forwarding units of network devices not illustrated in FIG. 2. Routing engine 42 may, in some cases, represent control plane management of packet forwarding throughout the network devices in cases where the network devices are part of a logical switch. For example, network device 110A includes interface cards 70A-70N (collectively, "IFCs 70") that receive packets via inbound links and send packets via outbound links. IFCs 70 typically have one or more physical network interface ports. In some examples, each network interface port (also referred to herein as an interface) may be sampled at sampling rates independently determined by flow collector 142 based on a comparison of parameters associated with sampling at different sampling rates, the number of flows an interface is handling, and/or whether the flows an interface is handling are more meaningful to a QoS than another interface. In some examples, after receiving a packet via IFCs 70, network device 110A uses forwarding unit 60 to forward the packet to a next destination based on operations performed by routing engine 42.

Routing engine 42 may provide an operating environment for various protocols (not illustrated in FIG. 2) that execute at different layers of a network stack. Routing engine 42 may be responsible for the maintenance of routing information 44 to reflect the current topology of a network and other network entities to which network device 110A is connected. In particular, routing protocols periodically update routing information 44 to accurately reflect the topology of the network and other entities based on routing protocol messages received by network device 110A. The protocols may be software processes executing on processing circuitry 40. In this way, routing engine 42 may occupy a group of compute nodes in processing circuitry 40 such that the group of compute nodes are not available to execute VMs. For example, routing engine 42 may include bridge port extension protocols, such as IEEE 802.1BR. Routing engine 42 may also include network protocols that operate at a network layer of the network stack. In the example of FIG. 2, network protocols may include one or more control and routing protocols such as border gateway protocol (BGP), internal gateway protocol (IGP), label distribution protocol (LDP) and/or resource reservation protocol (RSVP). In some examples, the IGP may include the open shortest path first (OSPF) protocol or the intermediate system-to-intermediate system (IS-IS) protocol. Routing engine 42 may also include one or more daemons that include user-level processes that run network management software, execute routing protocols to communicate with peer routers or switches, maintain and update one or more routing tables, and create one or more forwarding tables for installation to forwarding unit 60, among other functions.

Routing information 44 may include, for example, route data that describes various routes within the network, and corresponding next hop data indicating appropriate neighboring devices within the network for each of the routes. Network device 110A updates routing information 44 based on received advertisements to accurately reflect the topology of the network. Based on routing information 44, routing engine 42 may generate forwarding information (not illustrated in FIG. 2) and install forwarding data structures into the forwarding information within forwarding unit 60. The forwarding information associates network destinations with specific next hops and corresponding interface ports within the forwarding plane. Additionally, routing engine 42 may include one or more resource module(s) 46 for configuring resources for extended ports and uplink ports on satellite devices interconnected to network device 110A. Resource module(s) 46 may include a scheduler module for configuring Quality of Service (QoS) policies, firewall module for configuring firewall policies, or other modules for configuring a resource for network devices.

In some examples, processing circuitry 40 executes software plugin 48 and hypervisor 50. Software plugin 48 may, in some examples, enable network device 110A to communicate with orchestration engine 130. Software plugin 48 may be configured to interface with the lightweight message broker and hypervisor 50, such that software plugin 48 acts as an intermediary between orchestration engine 130 which outputs instructions to manage VMs 52 and hypervisor 50 which is configured implement instructions received from orchestration engine 130.

Software plugin 48 may interface with a lightweight message broker such as RabbitMQ to exchange messages with orchestration engine 130. As such, software plugin may implement any combination of AMQP, STOMP, MQTT, and HTTP. Software plugin 48 may be configured to generate and process messages transmitted via the lightweight message broker.

Hypervisor 50, in some cases, may be configured to communicate with software plugin 48 to manage lifecycles of VMs 52. In some examples, hypervisor 50 represents a Kernel-based Virtual Machine (KVM) hypervisor, a special operating mode of Quick Emulator (QEMU) which allows the Linux Kernel to function as a hypervisor. Hypervisor 50 may perform hardware-assisted virtualization, creating virtual machines that emulate the functions of computer hardware when the respective virtual machines are executed using compute nodes of processing circuitry 40. Hypervisor 50 may interface with software plugin 48.

Forwarding unit 60 represents hardware and logic functions that provide high-speed forwarding of network traffic. In some examples, forwarding unit 60 may be implemented as a programmable forwarding plane. Forwarding unit 60 may include a set of one or more forwarding chips programmed with forwarding information that maps network destinations with specific next hops and the corresponding output interface ports. In some examples, forwarding unit 60 includes forwarding information. In accordance with routing information 44, forwarding unit 60 maintains the forwarding information that associates network destinations with specific next hops and corresponding interface ports. For example, routing engine 42 may analyze routing information 44 and generate the forwarding information in accordance with routing information 44. The forwarding information may be maintained in the form of one or more tables, link lists, radix trees, databases, flat files, or any other data structures. Although not shown in FIG. 2, forwarding unit 60 may include a CPU, memory and one or more ASICs.

The architecture of network device 110A illustrated in FIG. 2 is shown for example purposes only. The disclosure is not limited to this architecture. In other examples, network device 110A may be configured in a variety of ways. In one example, some of the functionally of routing engine 42 and forwarding unit 60 may be distributed within IFCs 70.

Elements of control unit 32 may be implemented solely in software, or hardware, or may be implemented as combinations of software, hardware, or firmware. For example, control unit 32 may include one or more processors, one or more microprocessors, DSPs, ASICs, FPGAs, or any other equivalent integrated or discrete logic circuitry, or any combination thereof, which execute software instructions. In that case, the various software modules of control unit 32 may include executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 110A, e.g., protocols. Control unit 32, in some examples, retrieves and executes the instructions from memory for these aspects.

Figure 4:
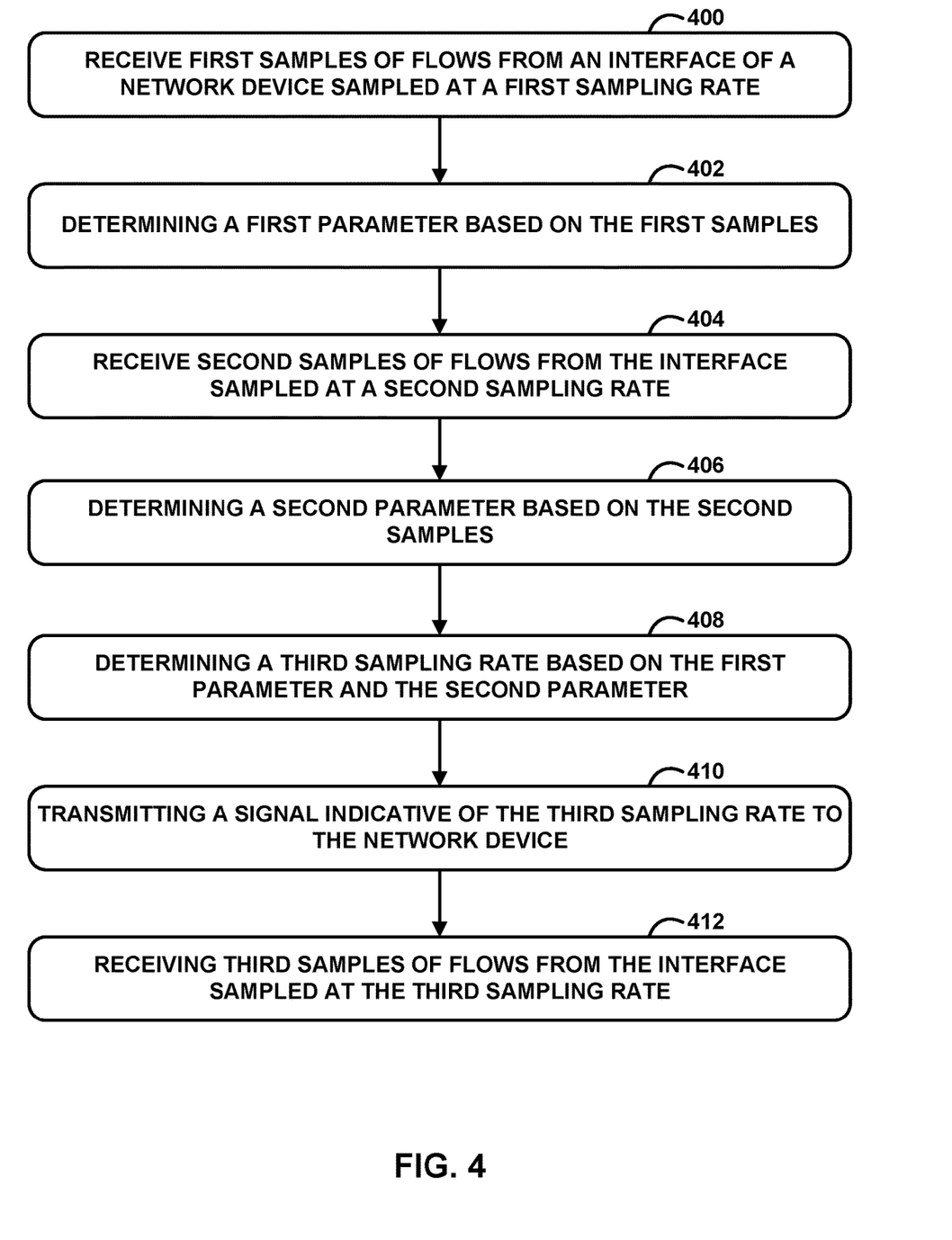
FIG. 4 is a flowchart illustrating an example method in accordance with one or more techniques of this disclosure.

FIG. 4 is a flowchart illustrating an example method in accordance with one or more techniques of this disclosure. Processing circuitry 243 of network analysis system 140 (FIG. 2) may receive first samples of flows from an interface of another network device sampled at a first sampling rate (400). For example, processing circuitry 40 of network device 110A (FIG. 3) may sample flows that IFC 70A (both of FIG. 3) is handling at a first sampling rate, create a first datagram including the samples, and forward the first datagram to network analysis system 140 which may receive the first samples in the first datagram. Processing circuitry 243 may determine a first parameter based on the first samples (402). For example, processing circuitry 243 may count a first number of flows in the first samples to determine the first parameter.

Processing circuitry 243 may receive second samples of flows from the interface sampled at a second sampling rate (404), wherein the second sampling rate is different than the first sampling rate. For example, processing circuitry 40 may sample flows that IFC 70A is handling at a second sampling rate, create a second datagram including the second samples, and forward the second datagram to network analysis system 140 which may receive the second samples in the second datagram. Processing circuitry 243 may determine a second parameter based on the second samples (406). For example, processing circuitry 243 may count a second number of flows in the second samples to determine the second parameter.

Processing circuitry 243 may determine a third sampling rate based on the first parameter and the second parameter (408). The third sampling rate may be different (e.g., higher or lower) than the second sampling rate. For example, processing circuitry 243 may compare the first parameter (e.g., the first number of flows) to the second parameter (e.g., the second number of flows) to determine whether the first parameter is equal to the second parameter or whether the first parameter is within a predetermined threshold of the second parameter. For example, if the first parameter is equal to the second parameter or within the predetermined threshold of the second parameter, processing circuitry 243 may determine the third sampling rate to be a lower sampling rate than the second sampling rate. If the first parameter is not equal to the second parameter or not within the predetermined threshold of the second parameter, processing circuitry 243 may determine the third sampling rate to be a higher sampling rate than the second sampling rate, for example the third sampling rate may be equal to the first sampling rate or a sampling rate between the second sampling rate and the first sampling rate.

Processing circuitry 243 may control one or more communication units 245 to transmit a signal indicative of the third sampling rate to the another network device (410). For example, network management system 140 may instruct network device 110A to sample on IFC 70A at the third sampling rate. Processing circuitry 243 may receive third samples of flows from the interface sampled at the third sampling rate (412). For example, processing circuitry 40 may sample flows that IFC 70A is handling at a third sampling rate, create a third datagram including the third samples, and forward the third datagram to network management system 140 which may receive the third samples.

In some examples, the first parameter is a first number of flows and the second parameter is a second number of flows. In some examples, IFC 70A is a first interface, and network management system 140 may receive fourth samples of flows from a second interface (e.g., IFC 70B) sampled at the first sampling rate. Network management system 140 may determine a third number of flows based on the fourth samples. Network management system 140 may determine that the third number of flows is greater than or equal to a predetermined threshold. Network management system 140 may determine a fourth sampling rate based on the third number of flows being greater than or equal to the predetermined threshold. Network management system 140 may transmit a signal indicative of the fourth sampling rate to network device 110A, wherein the fourth sampling rate is higher than the second sampling rate. Network management system 140 may receive fifth samples of flows from the second interface sampled at the fourth sampling rate.

In some examples, IFC 70A is a first interface, and network management system 140 may receive fourth samples of flows from a second interface (e.g., IFC 70B) sampled at the first sampling rate. Network management system 140 may determine that the second interface is handling more meaningful flows for a quality of experience than the first interface. Network management system 140 may determine a fourth sampling rate based on the second interface handling more meaningful flows for a quality of experience than the first interface. Network management system 140 may transmit a signal indicative of the fourth sampling rate to network device 110A, wherein the fourth sampling rate is higher than the second sampling rate. Network management system 140 may receive fifth samples of flows from the second interface sampled at the fourth sampling rate.

In some examples, the first number of flows is equal to the second number of flows or within a predetermined threshold of the second number of flows, and the third sampling rate is lower than the second sampling rate. In some examples, the predetermined threshold is static or is based on a determined number of flows at one of the plurality of sampling rates. For example, the predetermined threshold may be a number of flows or may be percentage of the number of determined flows at a sampling rate, such as at the second sampling rate. The predetermined threshold may be a user configurable value or determined according to a device capability or device role. When determined based on device capability, more powerful (capable) devices may have relatively higher threshold values than less powerful devices. When determined based on device role, various device roles, such as server leaf, border lead, gateway, spine, or the like, may have predetermined, respective thresholds.

In some examples, the first sampling rate is higher than the second sampling rate, the first number of flows is larger than the second number of flows, and the third sampling rate is higher than the second sampling rate. In some examples, the third sampling rate is equal to the first sampling rate.

In some examples, the first samples, the second samples, and the third samples are sFlow samples. In some examples, network management system 140 may repeat the techniques of FIG. 4 periodically.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method for flow monitoring, the method comprising:
receiving first information about flows from a network device measured at a first rate;
determining a first number of flows based on the first information;
receiving second information about flows from the network device measured at a second rate, wherein the first rate is higher than the second rate;
determining a second number of flows based on the second information, wherein the first number of flows is higher than the second number of flows;
determining a third rate based on the first number of flows and the second number of flows, wherein the third rate is higher than the second rate;
transmitting a signal indicative of the third rate to the network device; and
receiving third information about flows from the network device measured at the third rate.

2. The method of claim 1, further comprising:
receiving fourth information about flows from the network device measured at the first rate;
determining a third number of flows based on the fourth information;
determining that the third number of flows is greater than or equal to a predetermined threshold;
determining a fourth rate based on the third number of flows being greater than or equal to the predetermined threshold;
transmitting a signal indicative of the fourth rate to the network device, wherein the fourth rate is higher than the second rate; and
receiving fifth information about flows measured at the fourth rate.

3. The method of claim 1, wherein the network device comprises a first interface and a second interface, and wherein the first information, the second information, and the third information are received from the first interface, the method further comprising:
receiving fourth information about flows from the second interface of the network device measured at the first rate;
determining that the second interface is handling more meaningful flows for a quality of experience than the first interface;
determining a fourth rate based on the second interface handling more meaningful flows for a quality of experience than the first interface;
transmitting a signal indicative of the fourth rate to the network device, wherein the fourth rate is higher than the second rate; and
receiving fifth information about flows from the second interface measured at the fourth rate.

4. The method of claim 2, wherein the predetermined threshold is static or is based on a determined number of flows at one of a plurality of rates.

5. The method of claim 1, wherein the third rate is equal to the first rate.

6. The method of claim 1, wherein the first information, the second information, and the third information comprise sFlow samples.

7. The method of claim 1, wherein the method is repeated periodically.

8. A network device comprising:
memory configured to store a plurality of sampling rates;
a communication unit configured to transmit signals and receive samples of data flows; and
processing circuitry communicatively coupled to the memory and the communication unit, the processing circuitry being configured to:
receive first information about flows from another network device measured at a first rate;
determine a first number of flows based on the first information;
receive second information about flows from the network device measured at a second rate, wherein the first rate is higher than the second rate;
determine a second number of flows based on the second information, wherein the first number of flows is higher than the second number of flows;
determine a third rate based on the first number of flows and the second number of flows, wherein the third rate is higher than the second rate;
control the communication unit to transmit a signal indicative of the third rate to the another network device; and
receive third information about flows from the network device measured at the third rate.

9. The network device of claim 8, wherein the processing circuitry is further configured to:
- receive fourth information about flows from the network device measured at the first rate;
- determine a third number of flows based on the fourth information;
- determine that the third number of flows is greater than or equal to a predetermined threshold;
- determine a fourth rate based on the third number of flows being greater than or equal to the predetermined threshold;
- control the communication unit to transmit a signal indicative of the fourth rate to the network device, wherein the fourth rate is higher than the second rate; and
- receive fifth information about flows from the network device measured at the fourth rate.

10. The network device of claim 8, wherein the another network device comprises a first interface and a second interface, and wherein the first information, the second information, and the third information are received from the first interface, and wherein the processing circuitry is further configured to:
- receive fourth information about flows from a second interface measured at the first rate;
- determine that the second interface is handling more meaningful flows for a quality of experience than the first interface;
- determine a fourth rate based on the second interface handling more meaningful flows for a quality of experience than the first interface;
- control the communication unit to transmit a signal indicative of the fourth rate to the another network device, wherein the fourth rate is higher than the second rate; and
- receive fifth information about flows from the second interface measured at the fourth rate.

11. The network device of claim 8, wherein the predetermined threshold is static or is based on a determined number of flows at one of the plurality of rates.

12. The network device of claim 8, wherein the third rate is equal to the first rate.

13. The network device of claim 8, wherein the first information, the second information, and the third information comprise sFlow samples.

14. A non-transitory computer-readable medium comprising instructions for causing a programmable processor to:
- receive first information about flows from network device measured at a first rate;
- determine a first number of flows based on the first information;
- receive second information about flows from the network device measured at a second rate, wherein the first rate is higher than the second rate;
- determine a second number of flows based on the second information, wherein the first number of flows is higher than the second number of flows;
- determine a third rate based on the first number of flows and the second number of flows, wherein the third rate is higher than the second rate;
- control a communication unit to transmit a signal indicative of the third rate to the network device; and
- receive third information about flows from the network device measured at the third rate.

* * * * *